(12) United States Patent
Wang et al.

(10) Patent No.: US 11,757,580 B2
(45) Date of Patent: Sep. 12, 2023

(54) USER EQUIPMENT, BASE STATION, AND METHOD FOR MODIFYING DEMODULATION REFERENCE SIGNAL (DMRS) SEQUENCES

(71) Applicant: NTT DOCOMO, INC., Tokyo (JP)

(72) Inventors: Runxin Wang, Beijing (CN); Wenjia Liu, Beijing (CN); Xiaolin Hou, Beijing (CN); Daiki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 33 days.

(21) Appl. No.: 17/280,172

(22) PCT Filed: Sep. 28, 2018

(86) PCT No.: PCT/CN2018/108426
§ 371 (c)(1),
(2) Date: Mar. 25, 2021

(87) PCT Pub. No.: WO2020/062064
PCT Pub. Date: Apr. 2, 2020

(65) Prior Publication Data
US 2022/0006579 A1    Jan. 6, 2022

(51) Int. Cl.
*H04L 5/00* (2006.01)
*H04J 13/00* (2011.01)
*H04L 27/26* (2006.01)

(52) U.S. Cl.
CPC ........ *H04L 5/0016* (2013.01); *H04J 13/0022* (2013.01); *H04J 13/0062* (2013.01);
(Continued)

(58) Field of Classification Search
CPC . H04L 5/0016; H04L 5/0051; H04L 27/2607; H04L 27/2614; H04L 5/0091;
(Continued)

(56) References Cited

U.S. PATENT DOCUMENTS

2019/0052527 A1\* 2/2019 Ghosh ................. H04L 41/0873
2020/0100193 A1\* 3/2020 Cheng ................. H04W 52/146

FOREIGN PATENT DOCUMENTS

WO    WO-2014187781 A1 \* 11/2014    ......... H04B 17/0085

OTHER PUBLICATIONS

International Search Report issued in PCT/CN2018/108426 dated Jul. 2, 2019 (2 pages).
(Continued)

*Primary Examiner* — Mounir Moutaouakil
(74) *Attorney, Agent, or Firm* — Osha Bergman Watanabe & Burton LLP (57) ABSTRACT

Provided by an embodiment of the present invention are a user equipment and base station that may be used in a wireless communication system, or a method performed by the user equipment and the base station. The user equipment according to the embodiment of the present invention includes: a receiving unit that is configured to receive multiple access signature information for the user equipment from a base station, wherein the multiple access signature information includes correction information indicating a reference signal sequence sent with respect to the user equipment; and a control unit that is configured to determine the reference signal sequence of the user equipment according to the received correction information.

7 Claims, 5 Drawing Sheets

(52) U.S. Cl.
CPC ........ *H04L 5/0051* (2013.01); *H04L 27/2607* (2013.01); *H04L 27/2614* (2013.01)

(58) Field of Classification Search
CPC ......... H04L 27/26035; H04L 27/26134; H04L 27/2634; H04L 27/2613; H04J 13/0022; H04J 13/0062; H04J 11/0026; H04W 72/02
See application file for complete search history.

(56) References Cited

OTHER PUBLICATIONS

Samsung; "Collision analysis of grant-free based multiple access"; 3GPP TSG RAN WG1 Meeting #86bis, R1-1609038; Lisbon, Portugal; Oct. 10-14, 2016 (3 pages).

\* cited by examiner

| $n_{sf}$ | Multiple Access Mode | Spreading Factor |
|---|---|---|
| 0 | Orthogonal Multiple Access | NA |
| 1 | Bit-level Non-Orthogonal Multiple Access | NA |
| 2,4,… | Symbol-level Non-Orthogonal Multiple Access | 2,4,… |

Fig.4

| $n_{sf}$ | Multiple Access Mode | Spreading Factor |
|---|---|---|
| 0 | Orthogonal Multiple Access | 1 |
| 1 | Bit-level Non-Orthogonal Multiple Access | 2 |
| 2,… | Symbol-level Non-Orthogonal Multiple Access | 4,… |

Fig.5

| $n_{sg}$ | Spreading Sequence Group Index |
|---|---|
| 0 | Spreading sequence group 0 |
| 1 | Spreading sequence group 1 |
| 2 | Spreading sequence group 2 |
| 3 | Spreading sequence group 3 |

Fig.6

| $N_{ID}^{n_{SCID}}$ | Spreading Sequence Group Index | Spreading Factor | Number of Symbol Branches |
|---|---|---|---|
| 0 | Spreading sequence group 0 | 2 | 1 |
| 1 | Spreading sequence group 1 | 2 | 2 |
| 2 | Spreading sequence group 2 | 4 | 4 |
| 3 | Spreading sequence group 3 | 4 | 2 |

Fig.7

| $a$ | Spreading Factor |
|---|---|
| $\alpha_1$ | 1 |
| $\alpha_2$ | 2 |
| $\alpha_3$ | 4 |

Fig.8

| α | Spreading Sequence Group Index |
|---|---|
| $\alpha_1$ | Spreading sequence group 1 |
| $\alpha_2$ | Spreading sequence group 2 |
| $\alpha_3$ | Spreading sequence group 3 |

USER EQUIPMENT, BASE STATION, AND METHOD FOR MODIFYING DEMODULATION REFERENCE SIGNAL (DMRS) SEQUENCES

TECHNICAL FIELD

The present disclosure relates to a field of wireless communication, and in particular to a user equipment and a base station that may be used in a wireless communication system, or methods performed by a user equipment and a base station.

BACKGROUND

Non-Orthogonal Multiple Access (NOMA) is a wireless access technology proposed in the Long Term Evolution (LTE) version R-13 studied by the Third Generation Partnership Project (3GPP). In a current NOMA system, the number of ports for orthogonal demodulation reference signals (DMRS) is limited. Therefore, when DMRS sequences transmitted by different user equipment are the same, it will be unable to distinguish and decode the same DMRS sequences of different user equipment.

In addition, in the NOMA system, Multiple Access signature (MA signature) information is set for each user equipment to distinguish different user equipment and reduce interference between different user equipment. The multiple access signature information may include one or more of information indicating an interleaving manner employed by the user equipment when transmitting data, information indicating a scrambling manner employed by the user equipment when transmitting data, information indicating a spreading manner employed by the user equipment when transmitting data, and the like.

Taking into account the above application scenarios, in order to solve the problem of being unable to distinguish between the same DMRS sequences of different user equipment, it is desirable to provide a method for modifying DMRS sequences, which can reduce interference between different user equipment in the wireless communication system, reduce overhead, and improve performance of the wireless communication system.

SUMMARY OF THE DISCLOSURE

According to an aspect of the present disclosure, a user equipment is provided, comprising: a receiving unit configured to receive multiple access signature information for the user equipment from a base station, wherein the multiple access signature information includes modification information indicating a reference signal sequence transmitted by the user equipment; and a control unit configured to determine the reference signal sequence of the user equipment according to the received modification information.

According to an example of the present disclosure, wherein the modification information includes information for indicating at least one of a multiple access mode, a spreading factor, spreading sequence groups, a number of symbol branches, index of symbol branches, and a power allocation factor; the control unit determines the reference signal sequence of the user equipment according to the received information for indicating at least one of the multiple access mode, the spreading factor, the spreading sequence groups, the number of symbol branches, the index of symbol branches, and the power allocation factor.

According to an example of the present disclosure, wherein the reference signal sequence is a PN sequence, the control unit determines a pseudo-random initial sequence in the PN sequence according to the received modification information, and generates the PN sequence based on the pseudo-random initial sequence.

According to an example of the present disclosure, wherein the control unit determines at least one of a number of symbols in each slot, a density of physical layer cells, and a scrambling identifier according to the received modification information; and generates the pseudo-random initial sequence based on the at least one of the number of symbols in each slot, the density of physical layer cells, and the scrambling identifier.

According to an example of the present disclosure, wherein the reference signal sequence is a ZC sequence, the control unit determines a low peak-to-average power ratio sequence in the ZC sequence according to the received modification information, and generates the ZC sequence based on the low peak-to-average power ratio sequence.

According to an example of the present disclosure, wherein the control unit determines at least one of a base sequence and a cyclic shift according to the received modification information, and generates the low peak-to-average power ratio sequence based on the at least one of the base sequence and the cyclic shift.

According to another aspect of the present disclosure, a base station is provided, comprising: a control unit configured to determine multiple access signature information for a user equipment, wherein the multiple access signature information includes modification information indicating a reference signal sequence transmitted by the user equipment; and a transmitting unit configured to transmit the determined multiple access signature information to the user equipment.

According to an example of the present disclosure, wherein the modification information includes information for indicating at least one of a multiple access mode, a spreading factor, spreading sequence groups, a number of symbol branches, index of symbol branches, and a power allocation factor.

According to another aspect of the present disclosure, a method performed by a user equipment is provided, the method comprising: receiving multiple access signature information for the user equipment from a base station, wherein the multiple access signature information includes modification information indicating a reference signal sequence transmitted by the user equipment; and determining the reference signal sequence of the user equipment according to the received modification information.

According to an example of the present disclosure, wherein the modification information includes information for indicating at least one of a multiple access mode, a spreading factor, spreading sequence groups, a number of symbol branches, index of symbol branches, and a power allocation factor; the determining the reference signal sequence of the user equipment according to the received modification information includes: determining the reference signal sequence of the user equipment according to the received information for indicating at least one of the multiple access mode, the spreading factor, the spreading sequence groups, the number of symbol branches, the index of symbol branches, and the power allocation factor.

According to an example of the present disclosure, wherein the reference signal sequence is a PN sequence, the determining the reference signal sequence of the user equipment according to the received modification information includes: determining a pseudo-random initial sequence in the PN sequence according to the received modification information; and generating the PN sequence based on the pseudo-random initial sequence.

According to an example of the present disclosure, wherein the determining a pseudo-random initial sequence in the PN sequence according to the received modification information includes: determining at least one of a number of symbols in each slot, a density of physical layer cells, and a scrambling identifier according to the received modification information; and generating the pseudo-random initial sequence based on the at least one of the number of symbols in each slot, the density of physical layer cells, and the scrambling identifier.

According to an example of the present disclosure, wherein the reference signal sequence is a ZC sequence, the determining the reference signal sequence of the user equipment according to the received modification information includes: determining a low peak-to-average power ratio sequence in the ZC sequence according to the received modification information; and generating the ZC sequence based on the low peak-to-average power ratio sequence.

According to an example of the present disclosure, wherein the determining a low peak-to-average power ratio sequence in the ZC sequence according to the received modification information includes: determining at least one of a base sequence and a cyclic shift according to the received modification information; and generating the low peak-to-average power ratio sequence based on the at least one of the base sequence and the cyclic shift.

According to another aspect of the present disclosure, a method performed by a base station is provided, the method comprising: determining multiple access signature information for a user equipment, wherein the multiple access signature information includes modification information indicating a reference signal sequence transmitted by the user equipment; and transmitting the determined multiple access signature information to the user equipment.

According to an example of the present disclosure, wherein the modification information includes information for indicating at least one of a multiple access mode, a spreading factor, spreading sequence groups, a number of symbol branches, index of symbol branches, and a power allocation factor.

With the above aspects of the present disclosure, a relationship may be established between the multiple access signature information and the reference signal sequence of the user equipment to modify the reference signal sequence, thereby reducing interference between different user equipment in the wireless communication system, reducing overhead and improving performance of the wireless communication system.

BRIEF DESCRIPTION OF THE DRAWINGS

The above and other objectives, features and advantages of the present disclosure will become more apparent by describing embodiments of the present disclosure in details in conjunction with accompanying drawings.

DESCRIPTION OF THE EMBODIMENTS

Methods performed by a user equipment and a base station, a user equipment and a base station according to embodiments of the present disclosure will be described below with reference to the accompanying drawings. The same reference numerals represent the same elements throughout the accompanying drawings. It should be appreciated that the embodiments described herein are merely illustrative and should not be construed as limiting the scope of the present disclosure.

Figure 1:
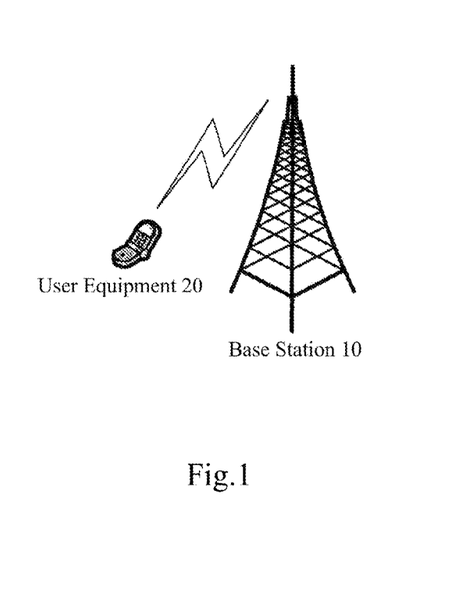
FIG. 1 shows a schematic diagram of a wireless communication system according to an embodiment of the present disclosure.

First, a wireless communication system according to an embodiment of the present disclosure will be described with reference to FIG. 1. As shown in FIG. 1, the wireless communication system may include a base station 10 and a user equipment (UE) 20. The UE 20 may communicate with the base station 10. It should be appreciated that although one base station and one UE are shown in FIG. 1, this is only illustrative, and the wireless communication system may include one or more base stations and one or more UEs.

Figure 2:
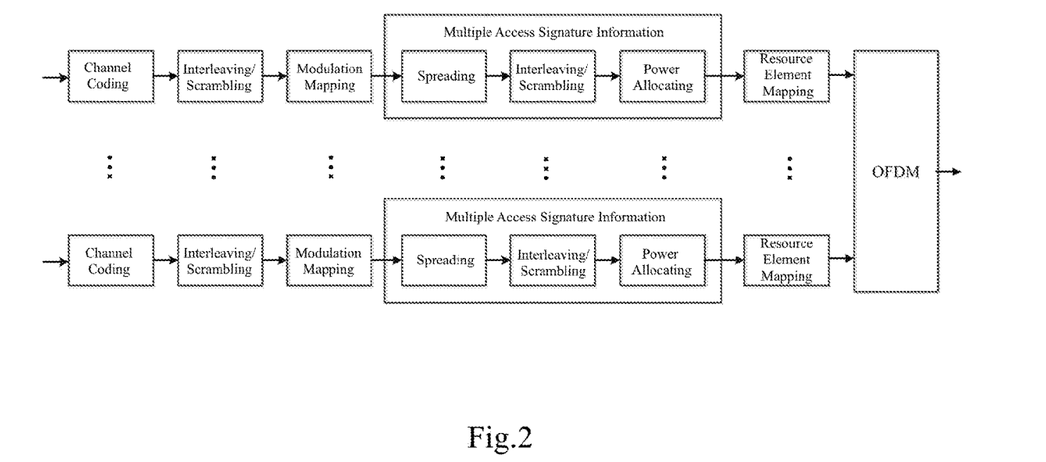
FIG. 2 shows a schematic diagram of a transmission scheme of non-orthogonal multiple access according to an embodiment of the present disclosure.

FIG. 2 shows a schematic diagram of a transmission scheme of non-orthogonal multiple access according to an embodiment of the present disclosure. In the example shown in FIG. 2, the same or similar processing as follows may be performed for each information bit: the information bit of the user equipment is channel coded firstly, and then the coded information bit is interleaved and/or scrambled and modulated. After that, the modulated bit sequence may be processed by using multiple access signature (MA signature) information. The processing may be, for example, a processing manner specified in the 3GPP standard TR 38.812, and may specifically include at least one of spreading, interleaving/scrambling, and power allocating. After the processing by the multiple access signature information, resource element (RE) mapping may be performed on the processed data, and finally OFDM symbols are generated for transmission. In addition, in the generation process of the OFDM symbols, any symbol generation manner may be used, for example, symbols of multiple branches may be combined into one branch of symbols, or symbols of multiple branches may be separated from one branch of symbols.

In the embodiment of the present disclosure, it is desirable to establish a mapping relationship between the above-mentioned multiple access signature information and a reference signal sequence of the user equipment, so that the multiple access signature information may be used to modify the reference signal sequence, so as to minimize interference between different user equipment.

Figure 3:
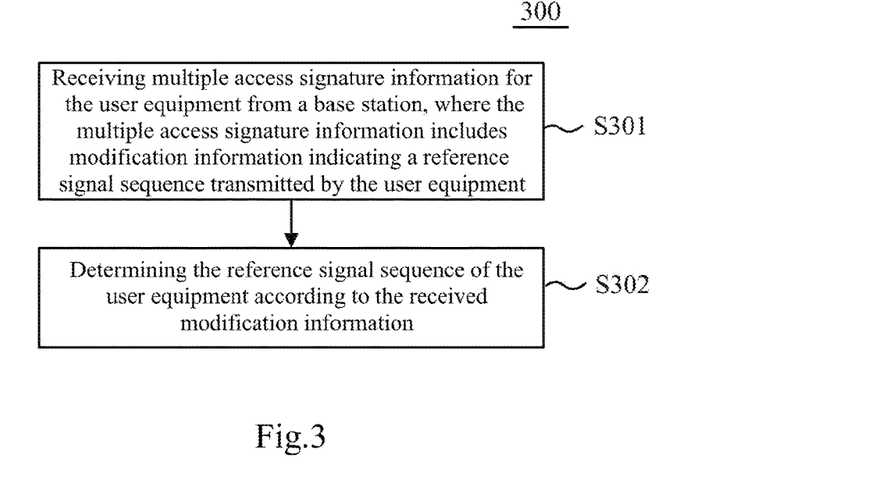
FIG. 3 shows a flowchart of a method performed by a user equipment according to an embodiment of the present disclosure.

FIG. 3 shows a flowchart of a method 300 performed by a user equipment according to an embodiment of the present disclosure.

As shown in FIG. 3, in step S301, multiple access signature information for the user equipment is received from a base station, where the multiple access signature information includes modification information indicating a reference signal sequence transmitted by the user equipment.

In this step, the user equipment may receive the multiple access signature information by using one of Radio Resource Control (RRC) signaling, Downlink Control Information (DCI), Media Access Control (MAC) control elements (CEs), and the like.

According to an embodiment of the present disclosure, the modification information included in the multiple access signature information may include information for indicating at least one of a multiple access mode, a spreading factor, spreading sequence groups, a number of symbol branches, index of symbol branches and a power allocation factor.

In an example, the modification information included in the multiple access signature information may include information for indicating a multiple access mode. For example, the multiple access mode may include at least one of Orthogonal Multiple Access (OMA), Bit-level Non-Orthogonal Multiple Access (Bit-level NOMA) and Symbol-level Non-Orthogonal Multiple Access (Symbol-level NOMA).

In another example, the modification information included in the multiple access signature information may include information for indicating a spreading factor. For example, the spreading factor may be one or more of 1, 2, 4 . . . .

In another example, the modification information included in the multiple access signature information may include information for indicating spreading sequence groups. The spreading sequence groups may be determined according to groups of user equipment. For example, when performing spreading sequence grouping, the spreading sequence groups used for user groups may be determined in a set of spreading sequences by different received powers. That is, received powers are the same or similar within a same spreading sequence group; and received powers are different between different spreading sequence groups. In addition, value ranges of spreading sequences may also be different.

In another example, the modification information included in the multiple access signature information may include information for indicating at least one of the number of symbol branches and index of symbol branches. The number of symbol branches herein may be used to indicate the number of branches when symbols of multiple branches are combined into one symbol, or symbols of multiple branches are separated from one symbol during the generation of the OFDM symbols as shown in FIG. 2. The index of symbol branches may be used to indicate a serial number of each symbol in symbols of multiple branches when the OFDM symbols are generated, for example, the third symbol of the symbols of four branches.

In another example, the modification information included in the multiple access signature information may include information for indicating a power allocation factor. For example, the power allocation factor may indicate power allocation of the multiple access signature information in FIG. 2 for determining a transmission power allocated to the user equipment.

The above-described content indicated by the modification information of the multiple access signature information are merely examples, and in practical application processes, the modification information may indicate any content, which is not limited herein.

In step S302, the reference signal sequence of the user equipment is determined according to the received modification information.

Specifically, the reference signal sequence of the user equipment may be modified according to the previously received information for indicating at least one of the multiple access mode, the spreading factor, the spreading sequence groups, the number of symbol branches, the index of symbol branches, and the power allocation factor, to determine the reference signal sequence of the user equipment, for example, a DMRS sequence. According to an embodiment of the present disclosure, a corresponding relationship between the information for indicating at least one of the multiple access mode, the spreading factor, the spreading sequence groups, the number of symbol branches, the index of symbol branches and the power allocation factor as described above and related parameters or factors used to form the reference signal sequence may be established, to modify and determine the reference signal sequence. The corresponding relationship described above may be stored in both the base station and the user equipment respectively in advance, may be indicated to the UE by the base station through MAC CEs, RRC, DCI and other signaling, or may be predetermined by the UE and notified to the base station, which is not limited herein.

In an implementation, the reference signal sequence may be a Pseudo-Noise (PN) sequence. For example, a pseudo-random sequence used to obtain the PN sequence may be initialized by $C_{init}$ (referred to as a pseudo-random initial sequence herein):

$$C_{init}=(2^{17}(N_{symb}^{slot}n_{s,f}^{\mu}+l+1)(2N_{ID}^{nSCID}+1)+2N_{ID}^{nSCID}n_{SCID}) \bmod 2^{31}$$

where $N_{symb}^{slot}$ is the number of symbols in each slot, $n_{s,f}^{\mu}$ is the number of slots (s) in a frame (f) used for subcarrier spacing configuration $\mu$, l is the number of OFDM symbols in a slot, $n_{SCID}$ is a scrambling identifier (scrambling ID), and $N_{ID}^{nSCID}$ is a density of physical layer cells corresponding to the scrambling identifier $n_{SCID}$. For example, the above initialization may be performed according to the 3GPP standard TS38.211. Then, the PN sequence may be generated based on the pseudo-random initial sequence $C_{init}$.

However, in this embodiment, considering the above-mentioned situation, modification information is introduced to modify the pseudo-random initial sequence $C_{init}$ generated in the above manner, and then modify the PN sequence.

Specifically, in the above example where the reference signal sequence is a PN sequence, the pseudo-random initial sequence $C_{init}$ in the PN sequence may be determined according to the received information for indicating at least one of the multiple access mode, the spreading factor, the spreading sequence groups, the number of symbol branches, the index of symbol branches, and the power allocation factor, and the PN sequence may be generated based on the pseudo-random initial sequence Gm. More specifically, a corresponding relationship between the information for indicating at least one of the multiple access mode, the spreading factor, the spreading sequence groups, the number of symbol branches, the index of symbol branches and the power allocation factor, and at least one of the number $N_{symb}^{slot}$ of symbols in each slot, the density $N_{ID}^{nSCID}$ of physical layer cells and the scrambling identifier $n_{SCID}$ may be established based on the above formula, to modify and determine the PN sequence.

Figure 4:
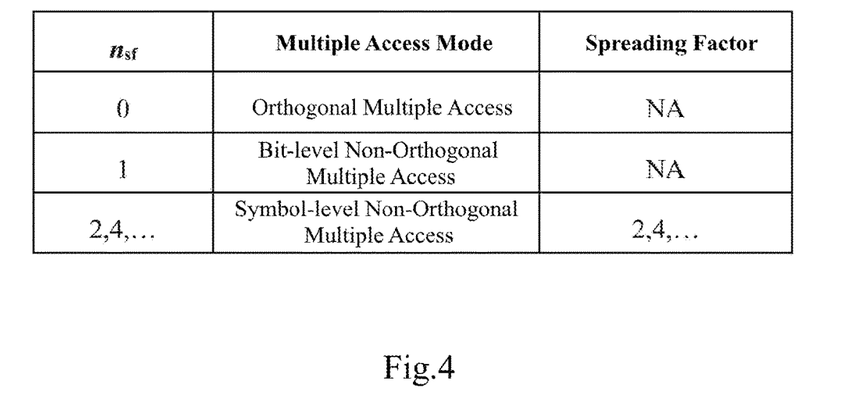
FIG. 4 shows an example of modifying a PN sequence according to an embodiment of the present disclosure.

In an example, a parameter $n_{sf}$ may be introduced to determine the pseudo-random initial sequence $C_{init}$ by using information indicating at least one of the multiple access mode and the spreading factor. FIG. 4 shows an example of modifying the PN sequence according to an embodiment of the present disclosure. As shown in FIG. 4, the parameter $n_{sf}$ may have a corresponding relationship with the multiple access mode (OMA, Bit-level Non-Orthogonal Multiple Access, Symbol-level Non-Orthogonal Multiple Access) and the spreading factor. FIG. 4 herein is only an example, and the corresponding relationship may also be other relationships. In practical application scenarios, the parameter $n_{sf}$ may be added as a modification term to the above formula, so that $C_{init}$ may be expressed as:

$$C_{init}=(2^{17}(N_{symb}^{slot}n_{s,f}^{\mu}+l+1)(2N_{ID}^{nSCID}+1)+ \\ 2N_{ID}^{nSCID}+n_{sf}+n_{SCID}) \bmod 2^{31}$$

where a value of the parameter $n_{sf}$ may depend on one or more of the corresponding multiple access mode and spreading factor in FIG. 4. In this example, the multiple access mode and the spreading factor may be indicated to the UE by the base station through signaling transmission modes such as MAC CEs, RRC, DCI and the like, so that the UE may learn a corresponding value of $n_{sf}$.

Figure 5:
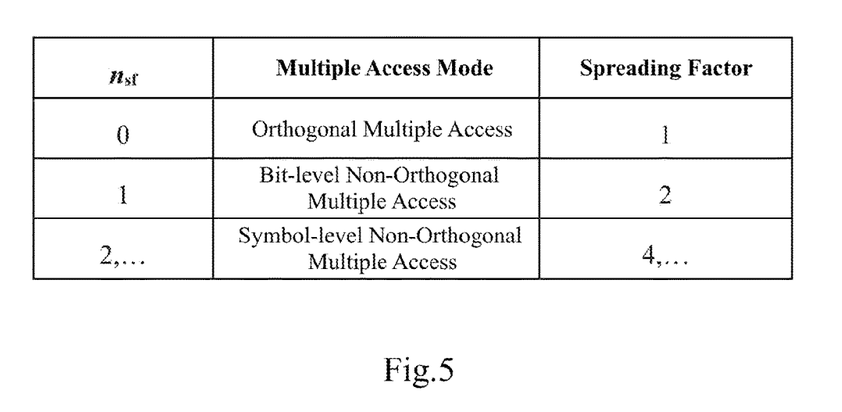
FIG. 5 shows an example of modifying a PN sequence according to an embodiment of the present disclosure.

In another example, the parameter $n_{sf}$ may also be introduced by using the information indicating at least one of the multiple access mode and the spreading factor, and the pseudo-random initial sequence $C_{init}$ is determined by using $2^{n_{sf}}$. FIG. 5 shows an example of modifying the PN sequence according to an embodiment of the present disclosure. As shown in FIG. 5, the parameter $n_{sf}$ may have a corresponding relationship with the multiple access mode (OMA, Bit-level Non-Orthogonal Multiple Access, Symbol-level Non-Orthogonal Multiple Access) and the spreading factor. In practical application scenarios, $2^{n_{sf}}$ may be added as a modification term to the above formula, so that $C_{init}$ may be expressed as:

$$C_{init}=(2^{17}(N_{symb}^{slot}n_{s,f}^{\mu}+l+1)(2N_{ID}^{nSCID}+1)+ \\ 2N_{ID}^{nSCID}+2^{n_{sf}}+n_{SCID}) \bmod 2^{31}$$

where a value of the parameter $n_{sf}$ may also depend on one or more of the corresponding multiple access mode and spreading factor in FIG. 5. FIG. 5 herein is only an example, and the parameter $n_{sf}$ may also have a corresponding relationship with other modification information, such as the number of symbol branches, the power allocation factor and the like. In this example, the multiple access mode and the spreading factor may be indicated to the UE by the base station through signaling transmission modes such as MAC CEs, RRC, DCI and the like, so that the UE may learn corresponding values of $n_{sf}$ and $2^{n_{sf}}$.

Certainly, the above methods of modifying $C_{init}$ by using $n_{sf}$ or $2^{n_{sf}}$ are only examples. In practical applications, parameters used to represent $C_{init}$, such as one or more of the number $N_{symb}^{slot}$ of symbols in each slot, the density $N_{ID}^{nSCID}$ of physical layer cells and the scrambling identifier $n_{SCID}$, may also be modified by using $n_{sf}$ or $2^{n_{sf}}$, to realize modification of the DMRS sequence.

Figure 6:
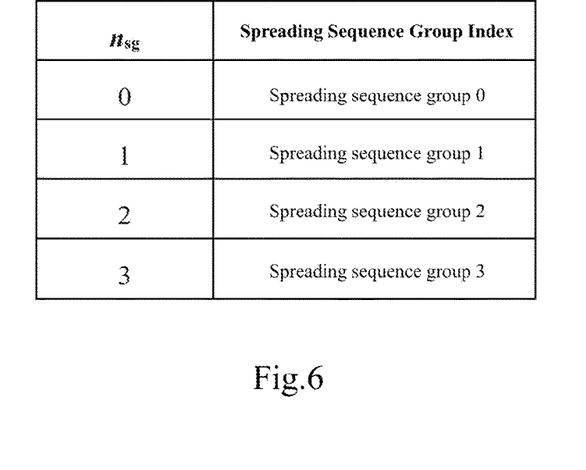
FIG. 6 shows an example of modifying a PN sequence according to an embodiment of the present disclosure.

In another example, a parameter $n_{sg}$ may be introduced to determine the pseudo-random initial sequence $C_{init}$ by using information for indicating spreading sequence groups. FIG. 6 shows an example of modifying the PN sequence according to an embodiment of the present disclosure. As shown in FIG. 6, the parameter $n_{sg}$ may have a corresponding relationship with a spreading sequence group index. For example, in FIG. 6, the spreading sequence group 0 may correspond to the value 0 of $n_{sg}$, and the spreading sequence group 1 may correspond to the value 1 of $n_{sg}$. FIG. 6 herein is only an example, and the parameter $n_{sg}$ may also have a corresponding relationship with other modification information, such as the number of symbol branches, the power allocation factor and the like. In practical application scenarios, the parameter $n_{sg}$ may be added as a modification term to the above formula, so that $C_{init}$ may be expressed as:

$$C_{init}=(2^{17}(N_{symb}^{slot}n_{s,f}^{\mu}+l+1)(2N_{ID}^{nSCID}+1)+ \\ 2N_{ID}^{nSCID}+n_{sg}+n_{SCID}) \bmod 2^{31}$$

In this example, the spreading sequence group index may be indicated to the UE by the base station through signaling transmission modes such as MAC CEs, RRC, DCI and the like, so that the UE may learn a corresponding value of $n_{sg}$.

Further, the above method of modifying $C_{init}$ by using $n_{sg}$ is also only an example. In practical applications, $C_{init}$ or the parameters used to represent $C_{init}$, such as one or more of the number $N_{symb}^{slot}$ of symbols in each slot, the density $N_{ID}^{nSCID}$ of physical layer cells and the scrambling identifier $n_{SCID}$, may also be modified by using $n_{sg}$ or the aforementioned $n_{sf}$ or $2^{n_{sf}}$, to realize modification of the DMRS sequence.

Other examples of the formula expression after modifying $C_{init}$ or the parameters used to represent $C_{init}$ by using $n_{sg}$, $n_{sf}$ or $2^{n_{sf}}$ are listed below:

$$C_{init}=(2^{17}(N_{symb}^{slot}n_{s,f}^{\mu}+l+1)(2N_{ID}^{nSCID}+1)+ \\ 2(N_{ID}^{nSCID}+n_{sf})+n_{SCID}) \bmod 2^{31}$$

$$C_{init}=(2^{17}(N_{symb}^{slot}n_{s,f}^{\mu}+l+1)(2N_{ID}^{nSCID}+1)+ \\ 2(N_{ID}^{nSCID}+n_{sg})+n_{SCID}) \bmod 2^{31}$$

$$C_{init}=(2^{17}(N_{symb}^{slot}n_{s,f}^{\mu}+l+1)(2N_{ID}^{nSCID}+1)+ \\ 2(N_{ID}^{nSCID}+2^{n_{sf}})+n_{SCID}) \bmod 2^{31}$$

$$C_{init}=(2^{17}(N_{symb}^{slot}n_{s,f}^{\mu}+l+1)(2N_{ID}^{nSCID}+2^{n_{sf}}+1)+ \\ 2(N_{ID}^{nSCID}+2^{n_{sf}})+n_{SCID}) \bmod 2^{31}$$

$$C_{init}=(2^{17}(N_{symb}^{slot}n_{s,f}^{\mu}+l+1)(2N_{ID}^{nSCID}+1)+ \\ 2N_{ID}^{nSCID}+n_{SCID}+2^{k}n_{sf}) \bmod 2^{31}$$

Figure 7:
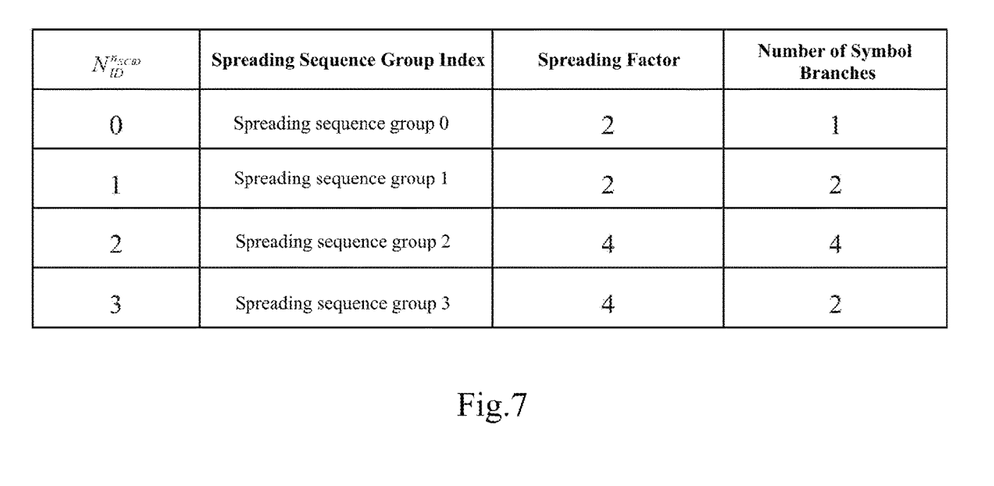
FIG. 7 shows an example of modifying a PN sequence according to an embodiment of the present disclosure.

In another example, it is also possible to construct different value ranges for one or more of the parameters used to represent $C_{init}$, and to establish corresponding relationships between the different parameter values and the modification information in the multiple access signature information, so as to realize modification of the DMRS sequence. FIG. 7 shows an example of modifying the PN sequence according to an embodiment of the present disclosure. As shown in FIG. 7, the parameter $N_{ID}^{nSCID}$ may have corresponding relationships with various values of the spreading sequence group index, the spreading factor, and the number of symbol branches respectively. For example, in FIG. 7, the spreading sequence group 1, the spreading factor 2, the number 2 of symbol branches (that is, one symbol is separated into symbols of 2 branches) may correspond to the value 1 of $N_{ID}^{nSCID}$. In practical application scenarios, the corresponding value of $N_{ID}^{nSCID}$ may be substituted into any of the aforementioned expressions of $C_{init}$ to modify the DMRS sequence.

In another example, the value range of the scrambling identifier $n_{SCID}$ may also be changed, for example, may be changed from {0, 1} to {0, 1, 2, 3}, and accordingly, the value range of $N_{ID}^{nSCID}$ may be changed correspondingly. For example, when $n_{SCID}$ is 2, the value range of $N_{ID}^{nSCID}$ may be {0, 1, . . . , 7}; and when $n_{SCID}$ is 3, the value range of $N_{ID}^{nSCID}$ may be {0, 1, 2, 3}. In practical application scenarios, corresponding values of the scrambling identifier $n_{SCID}$ and $N_{ID}^{nSCID}$ whose value ranges have been changed may be substituted into any of the aforementioned expressions of $C_{init}$ to modify the DMRS sequence.

The specific examples of the implementation of the reference signal sequence being a PN sequence have been described above. In another implementation, the reference signal sequence may be a ZC (Zadoff-Chu) sequence. For example, a low peak-to-average power ratio (low-PAPR) sequence $r_{u,v}^{(\alpha, \delta)}(n)$ used to obtain the ZC sequence may be expressed as:

$$r_{u,v}^{(\alpha,\delta)}(n) = e^{j\alpha n}\bar{r}_{u,v}, \quad 0 \leq n \leq M_{ZC}$$

where $\alpha$ is a cyclic shift; $\delta$, u, and v are generation parameters of the sequence; $\bar{r}_{u,v}(n)$ is a base sequence; and $M_{ZC}$ is a length of the ZC sequence. For example, the aforementioned low peak-to-average power ratio sequence may be obtained according to the 3GPP standard TS38.211.

Then, the ZC sequence may be generated based on the low peak-to-average power ratio sequence $r_{u,v}^{(\alpha, \delta)}(n)$.

However, in this embodiment, considering the above-mentioned situation, modification information is introduced to modify the low peak-to-average power ratio sequence $r_{u,v}^{(\alpha, \delta)}(n)$ generated in the above manner, and then modify the ZC sequence.

Specifically, in the above example where the reference signal sequence is a ZC sequence, the low peak-to-average power ratio sequence $r_{u,v}^{(\alpha, \delta)}(n)$ in the ZC sequence may be determined according to the received information for indicating at least one of the multiple access mode, the spreading factor, the spreading sequence groups, the number of symbol branches, the index of symbol branches, and the power allocation factor, and the ZC sequence may be generated based on the low peak-to-average power ratio sequence $r_{u,v}^{(\alpha, \delta)}(n)$. More specifically, a corresponding relationship between the information for indicating at least one of the multiple access mode, the spreading factor, the spreading sequence groups, the number of symbol branches, the index of symbol branches and the power allocation factor, and at least one of the base sequence $\bar{r}_{u,v}(n)$ and the cyclic shift $\alpha$ may also be established based on the above formula, to modify and determine the ZC sequence.

Figure 8:
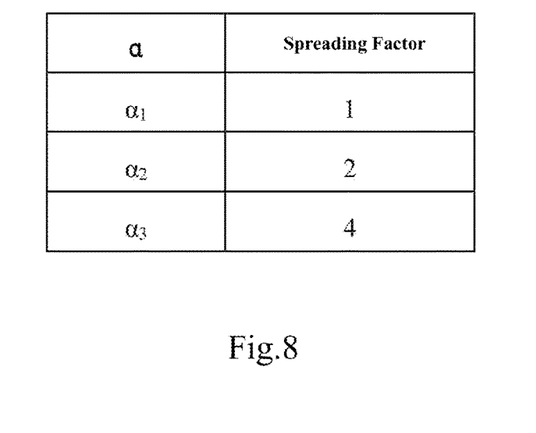
FIG. 8 shows an example of modifying a ZC sequence according to an embodiment of the present disclosure.

In an example, the information indicating the spreading factor may be used to modify the cyclic shift $\alpha$, to determine the low peak-to-average power ratio sequence $r_{u,v}^{(\alpha, \delta)}(n)$. FIG. 8 shows an example of modifying the ZC sequence according to an embodiment of the present disclosure. As shown in FIG. 8, the cyclic shift $\alpha$ may have a corresponding relationship with the spreading factor. For example, when the spreading factor is 1, $\alpha$ may take the value $\alpha_1$; and when the spreading factor is 2, $\alpha$ may take the value $\alpha_2$. FIG. 8 herein is only an example, and the corresponding relationship may also be other relationships. In this example, the spreading factor may be indicated to the UE by the base station through signaling transmission modes such as MAC CEs, RRC, DCI and the like, so that the UE may learn a corresponding value of the cyclic shift $\alpha$ according to a value of the spreading factor, and substitute it into the above formula to determine the low peak-to-average power ratio sequence $r_{u,v}^{(\alpha, \delta)}(n)$.

Figure 9:
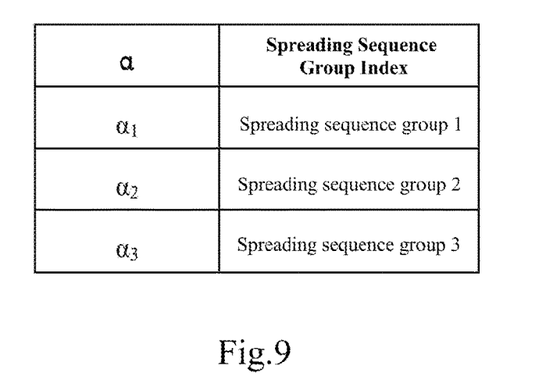
FIG. 9 shows an example of modifying a ZC sequence according to an embodiment of the present disclosure.

In another example, the information indicating the spreading sequence groups may be used to modify the cyclic shift $\alpha$, to determine the low peak-to-average power ratio sequence $r_{u,v}^{(\alpha, \delta)}(n)$. FIG. 9 shows an example of modifying the ZC sequence according to an embodiment of the present disclosure. As shown in FIG. 9, the cyclic shift $\alpha$ may have a corresponding relationship with the spreading sequence group index. For example, in FIG. 9, the spreading sequence group 1 may correspond to the value $\alpha_1$ of $\alpha$, and the spreading sequence group 2 may correspond to the value $\alpha_2$ of $\alpha$. FIG. 9 herein is only an example, and the corresponding relationship may also be other relationships. In practical application scenarios, the value of the cyclic shift a may be substituted into the above formula to determine the low peak-to-average power ratio sequence $r_{u,v}^{(\alpha, \delta)}(n)$.

Certainly, the above method of modifying $r_{u,v}^{(\alpha, \delta)}(n)$ by using the value of the cyclic shift $\alpha$ is only an example. In practical applications, one or more of other modification information of the multiple access signature information may also be used to modify the above formula to realize modification of the DMRS sequence.

With the above method of the present disclosure, a relationship may be established between the multiple access signature information and the reference signal sequence of the user equipment to modify the reference signal sequence, thereby reducing interference between different user equipment in the wireless communication system, reducing overhead and improving performance of the wireless communication system.

Figure 10:
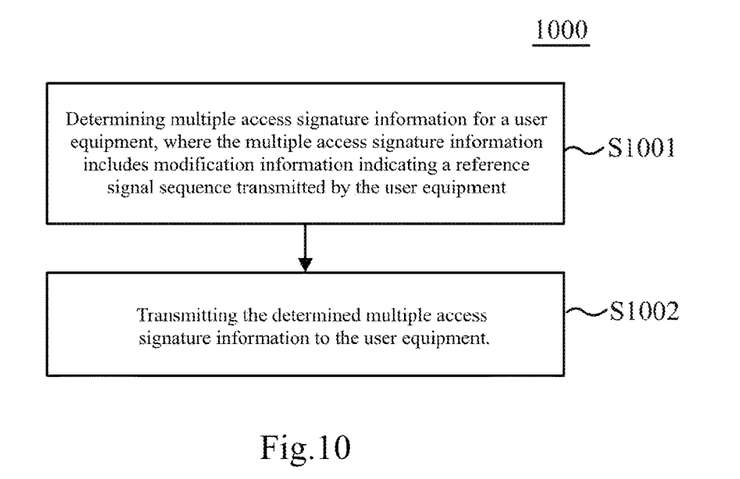
FIG. 10 shows a flowchart of a method performed by a base station according to an embodiment of the present disclosure.

FIG. 10 shows a flowchart of a method 1000 performed by a base station according to an embodiment of the present disclosure As shown in FIG. 10, in step S1001, multiple access signature information for a user equipment is determined, where the multiple access signature information includes modification information indicating a reference signal sequence transmitted by the user equipment.

According to an embodiment of the present disclosure, the modification information included in the multiple access signature information indicating the reference signal sequence transmitted by the user equipment may include information for indicating at least one of a multiple access mode, a spreading factor, spreading sequence groups, a number of symbol branches, index of symbol branches and a power allocation factor.

In an example, the modification information included in the multiple access signature information may include information for indicating a multiple access mode. For example, the multiple access mode may include at least one of Orthogonal Multiple Access (OMA), Bit-level Non-Orthogonal Multiple Access (Bit-level NOMA) and Symbol-level Non-Orthogonal Multiple Access (Symbol-level NOMA).

In another example, the modification information included in the multiple access signature information may include information for indicating a spreading factor. For example, the spreading factor may be one or more of 1, 2, 4 . . . .

In another example, the modification information included in the multiple access signature information may include information for indicating spreading sequence groups. The spreading sequence groups may be determined according to groups of user equipment. For example, when performing spreading sequence grouping, the spreading sequence groups used for user groups may be determined in a set of spreading sequences by different received powers. That is, received powers are the same or similar within a same spreading sequence group; and received powers are different between different spreading sequence groups. In addition, value ranges of spreading sequences may also be different.

In another example, the modification information included in the multiple access signature information may include information for indicating at least one of the number of symbol branches and index of symbol branches. The number of symbol branches herein may be used to indicate the number of branches when symbols of multiple branches are combined into one symbol, or symbols of multiple branches are separated from one symbol during the generation of the OFDM symbols as shown in FIG. 2. The index of symbol branches may be used to indicate a serial number of each symbol in symbols of multiple branches when the OFDM symbols are generated, for example, the third symbol of the symbols of four branches.

In another example, the modification information included in the multiple access signature information may include information for indicating a power allocation factor. For example, the power allocation factor may indicate power allocation of the multiple access signature information in FIG. 2 for determining a transmission power allocated to the user equipment.

The above-described content indicated by the modification information of the multiple access signature information are merely examples, and in practical application processes, the modification information may indicate any other content, which is not limited herein.

In step S1002, the determined multiple access signature information is transmitted to the user equipment.

In this step, the determined multiple access signature information may be transmitted to the user equipment by using one of Radio Resource Control (RRC) signaling, Downlink Control Information (DCI), Media Access Control (MAC) control elements (CEs) and the like, so that the user equipment may modify the reference signal sequence of the user equipment according to the information for indicating at least one of the multiple access mode, the spreading factor, the spreading sequence groups, the number of symbol branches, the index of symbol branches and the power allocation factor, to determine the reference signal sequence of the user equipment, such as, a DMRS sequence.

With the above method of the present disclosure, a relationship may be established between the multiple access signature information and the reference signal sequence of the user equipment to modify the reference signal sequence, thereby reducing interference between different user equipment in the wireless communication system, reducing overhead and improving performance of the wireless communication system.

A user equipment according to an embodiment of the present application will be described below with reference to FIG. 11. The user equipment may perform the method performed by a user equipment as described above. Since operations of the user equipment are substantially the same as the steps of the method described above, only a brief description is provided herein, while repeated descriptions of the same content are omitted.

Figure 11:
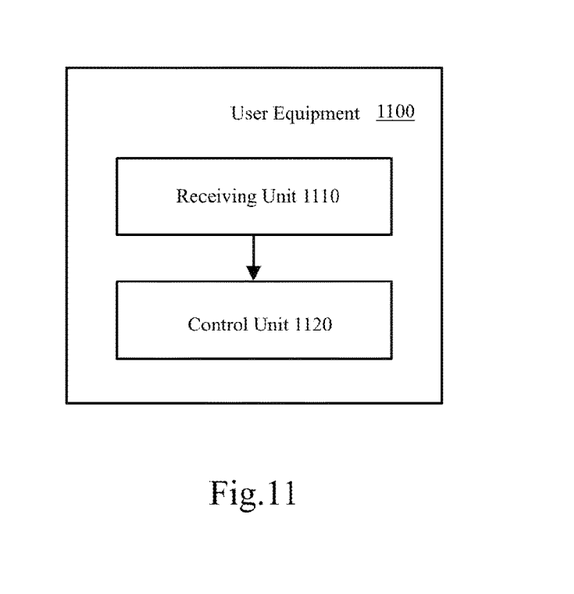
FIG. 11 shows a structural block diagram of a user equipment according to an embodiment of the present disclosure.

As shown in FIG. 11, the user equipment 1100 includes a receiving unit 1110 and a control unit 1120. It should be appreciated that only components related to the embodiments of the present application are shown in FIG. 11 while other components are omitted, but this is only illustrative, and the user equipment 1100 may include other components as required.

The receiving unit 1110 receives multiple access signature information for the user equipment from a base station, where the multiple access signature information includes modification information indicating a reference signal sequence transmitted by the user equipment.

The receiving unit 1110 may receive the multiple access signature information by using one of Radio Resource Control (RRC) signaling, Downlink Control Information (DCI), Media Access Control (MAC) control elements (CEs), and the like.

According to an embodiment of the present disclosure, the modification information included in the multiple access signature information may include information for indicating at least one of a multiple access mode, a spreading factor, spreading sequence groups, a number of symbol branches, index of symbol branches and a power allocation factor.

In an example, the modification information included in the multiple access signature information may include information for indicating a multiple access mode. For example, the multiple access mode may include at least one of Orthogonal Multiple Access (OMA), Bit-level Non-Orthogonal Multiple Access (Bit-level NOMA) and Symbol-level Non-Orthogonal Multiple Access (Symbol-level NOMA).

In another example, the modification information included in the multiple access signature information may include information for indicating a spreading factor. For example, the spreading factor may be one or more of 1, 2, 4 . . . .

In another example, the modification information included in the multiple access signature information may include information for indicating spreading sequence groups. The spreading sequence groups may be determined according to groups of user equipment. For example, when performing spreading sequence grouping, the spreading sequence groups used for user groups may be determined in a set of spreading sequences by different received powers. That is, received powers are the same or similar within a same spreading sequence group; and received powers are different between different spreading sequence groups. In addition, value ranges of spreading sequences may also be different.

In another example, the modification information included in the multiple access signature information may include information for indicating at least one of the number of symbol branches and index of symbol branches. The number of symbol branches herein may be used to indicate the number of branches when symbols of multiple branches are combined into one symbol, or symbols of multiple branches are separated from one symbol during the generation of the OFDM symbols as shown in FIG. 2. The index of symbol branches may be used to indicate a serial number of each symbol in symbols of multiple branches when the OFDM symbols are generated, for example, the third symbol of the symbols of four branches.

In another example, the modification information included in the multiple access signature information may include information for indicating a power allocation factor. For example, the power allocation factor may indicate power allocation of the multiple access signature information in FIG. 2 for determining a transmission power allocated to the user equipment.

The above-described content indicated by the modification information of the multiple access signature information are merely examples, and in practical application processes, the modification information may indicate any content, which is not limited herein.

The control unit 1120 determines the reference signal sequence of the user equipment according to the received modification information.

Specifically, the control unit 1120 may modify the reference signal sequence of the user equipment according to the previously received information for indicating at least one of the multiple access mode, the spreading factor, the spreading sequence groups, the number of symbol branches, the index of symbol branches, and the power allocation factor, to determine the reference signal sequence of the user equipment, for example, a DMRS sequence. According to an embodiment of the present disclosure, the control unit 1120 may establish a corresponding relationship between the information for indicating at least one of the multiple access mode, the spreading factor, the spreading sequence groups, the number of symbol branches, the index of symbol branches and the power allocation factor as described above and related parameters or factors used to form the reference signal sequence, to modify and determine the reference signal sequence. The corresponding relationship described above may be stored in both the base station and the user equipment respectively in advance, may be indicated to the UE by the base station through MAC CEs, RRC, DCI and other signaling, or may be predetermined by the UE and notified to the base station, which is not limited herein.

In an implementation, the reference signal sequence may be a Pseudo-Noise (PN) sequence. For example, a pseudo-random sequence used to obtain the PN sequence may be initialized by $C_{init}$ (referred to as a pseudo-random initial sequence herein):

$$C_{init}=(2^{17}(N_{symb}^{slot}n_{s,f}^{\mu}+l+1)(2N_{ID}^{nSCID}+1)+2N_{ID}^{nSCID}+n_{SCID}) \bmod 2^{31}$$

where $N_{symb}^{slot}$ is the number of symbols in each slot, $n_{s,f}^{\mu}$ is the number of slots (s) in a frame (f) used for subcarrier spacing configuration $\mu$, l is the number of OFDM symbols in a slot, $n_{SCID}$ is a scrambling identifier (scrambling ID), and $N_{ID}^{nSCID}$ is a density of physical layer cells corresponding to the scrambling identifier $n_{SCID}$. For example, the above initialization may be performed according to the 3GPP standard TS38.211. Then, the control unit 1120 may generate the PN sequence based on the pseudo-random initial sequence $C_{init}$.

However, in this embodiment, considering the above-mentioned situation, modification information is introduced to modify the pseudo-random initial sequence $C_{init}$ generated in the above manner, and then modify the PN sequence.

Specifically, in the above example where the reference signal sequence is a PN sequence, the pseudo-random initial sequence $C_{init}$ in the PN sequence may be determined according to the received information for indicating at least one of the multiple access mode, the spreading factor, the spreading sequence groups, the number of symbol branches, the index of symbol branches, and the power allocation factor, and the PN sequence may be generated based on the pseudo-random initial sequence $C_{init}$. More specifically, a corresponding relationship between the information for indicating at least one of the multiple access mode, the spreading factor, the spreading sequence groups, the number of symbol branches, the index of symbol branches and the power allocation factor, and at least one of the number $N_{symb}^{slot}$ of symbols in each slot, the density $N_{ID}^{nSCID}$ of physical layer cells and the scrambling identifier $n_{SCID}$ may be established based on the above formula, to modify and determine the PN sequence.

In an example, a parameter $n_{sf}$ may be introduced to determine the pseudo-random initial sequence Chin by using information indicating at least one of the multiple access mode and the spreading factor. FIG. 4 shows an example of modifying the PN sequence according to an embodiment of the present disclosure. As shown in FIG. 4, the parameter $n_{sf}$ may have a corresponding relationship with the multiple access mode (OMA, Bit-level Non-Orthogonal Multiple Access, Symbol-level Non-Orthogonal Multiple Access) and the spreading factor. FIG. 4 herein is only an example, and the corresponding relationship may also be other relationships. In practical application scenarios, the parameter $n_{sf}$ may be added as a modification term to the above formula, so that $C_{init}$ may be expressed as:

$$C_{init}=(2^{17}(N_{symb}^{slot}n_{s,f}^{\mu}+l+1)(2N_{ID}^{nSCID}+1)+2N_{ID}^{nSCID}+n_{sf}+n_{SCID}) \bmod 2^{31}$$

where a value of the parameter $n_{sf}$ may depend on one or more of the corresponding multiple access mode and spreading factor in FIG. 4. In this example, the multiple access mode and the spreading factor may be indicated to the UE by the base station through signaling transmission modes such as MAC CEs, RRC, DCI and the like, so that the UE may learn a corresponding value of $n_{sf}$.

In another example, the parameter $n_{sf}$ may also be introduced by using the information indicating at least one of the multiple access mode and the spreading factor, and the pseudo-random initial sequence $C_{init}$ is determined by using $2^{n_{sf}}$. FIG. 5 shows an example of modifying the PN sequence according to an embodiment of the present disclosure. As shown in FIG. 5, the parameter $n_{sf}$ may have a corresponding relationship with the multiple access mode (OMA, Bit-level Non-Orthogonal Multiple Access, Symbol-level Non-Orthogonal Multiple Access) and the spreading factor. In practical application scenarios, $2^{n_{sf}}$ may be added as a modification term to the above formula, so that $C_{init}$ may be expressed as:

$$C_{init}=(2^{17}(N_{symb}^{slot}n_{s,f}^{\mu}+l+1)(2N_{ID}^{nSCID}+1)+2N_{ID}^{nSCID}+n_{SCID}+2^{k}n_{sf}) \bmod 2^{31}$$

where a value of the parameter $n_{sf}$ may also depend on one or more of the corresponding multiple access mode and spreading factor in FIG. 5. FIG. 5 herein is only an example, and the parameter $n_{sf}$ may also have a corresponding relationship with other modification information, such as the number of symbol branches, the power allocation factor and the like. In this example, the multiple access mode and the spreading factor may be indicated to the UE by the base station through signaling transmission modes such as MAC CEs, RRC, DCI and the like, so that the UE may learn corresponding values of $n_{sf}$ and $2^{n_{sf}}$.

Certainly, the above methods of modifying $C_{init}$ by using $n_{sf}$ or $2^{n_{sf}}$ are only examples. In practical applications, parameters used to represent $C_{init}$, such as one or more of the number $N_{symb}^{slot}$ of symbols in each slot, the density $N_{ID}^{nSCID}$ of physical layer cells and the scrambling identifier $n_{SCID}$, may also be modified by using $n_{sf}$ or $2^{n_{sf}}$, to realize modification of the DMRS sequence.

In another example, a parameter $n_{sg}$ may be introduced to determine the pseudo-random initial sequence $C_{init}$ by using information for indicating spreading sequence groups. FIG. 6 shows an example of modifying the PN sequence according to an embodiment of the present disclosure. As shown in FIG. 6, the parameter $n_{sg}$ may have a corresponding relationship with a spreading sequence group index. For example, in FIG. 6, the spreading sequence group 0 may correspond to the value 0 of $n_{sg}$, and the spreading sequence group 1 may correspond to the value 1 of $n_{sg}$. FIG. 6 herein is only an example, and the parameter $n_{sg}$ may also have a corresponding relationship with other modification information, such as the number of symbol branches, the power allocation factor and the like. In practical application scenarios, the parameter $n_{sg}$ may be added as a modification term to the above formula, so that $C_{init}$ may be expressed as:

$$C_{init} = (2^{17}(N_{symb}^{slot}n_{s,f}\mu + l + 1)(2N_{ID}^{nSCID} + 1) + 2N_{ID}^{nSCID} + n_{sf} + n_{SCID}) \bmod 2^{31}$$

In this example, the spreading sequence group index may be indicated to the UE by the base station through signaling transmission modes such as MAC CEs, RRC, DCI and the like, so that the UE may learn a corresponding value of $n_{sg}$.

Further, the above method of modifying $C_{init}$ by using $n_{sg}$ is also only an example. In practical applications, $C_{init}$ or the parameters used to represent $C_{init}$, such as one or more of the number $N_{symb}^{slot}$ of symbols in each slot, the density $N_{ID}^{nSCID}$ of physical layer cells and the scrambling identifier $n_{SCID}$, may also be modified by using $n_{sg}$ or the aforementioned $n_{sf}$ or $2^{n_{sf}}$, to realize modification of the DMRS sequence.

Other examples of the formula expression after modifying $C_{init}$ or the parameters used to represent $C_{init}$ by using $n_{sg}$, $n_{sf}$ or $2^{n_{sf}}$ are listed below:

$$C_{init} = (2^{17}(N_{symb}^{slot}n_{s,f}\mu + l + 1)(2N_{ID}^{nSCID} + 1) + 2(N_{ID}^{nSCID} + n_{sf}) + n_{SCID}) \bmod 2^{31}$$

$$C_{init} = (2^{17}(N_{symb}^{slot}n_{s,f}\mu + l + 1)(2N_{ID}^{nSCID} + 1) + 2(N_{ID}^{nSCID} + n_{sg}) + n_{SCID}) \bmod 2^{31}$$

$$C_{init} = (2^{17}(N_{symb}^{slot}n_{s,f}\mu + l + 1)(2N_{ID}^{nSCID} + 1) + 2(N_{ID}^{nSCID} + 2^n) + n_{SCID}) \bmod 2^{31}$$

$$C_{init} = (2^{17}(N_{symb}^{slot}n_{s,f}\mu + l + 1)(2N_{ID}^{nSCID} + 2^{n_{sf}}) + 1) + 2(N_{ID}^{nSCID} + 2^{n_{sf}}) + n_{SCID}) \bmod 2^{31}$$

$$C_{init} = (2^{17}(N_{symb}^{slot}n_{s,f}\mu + l + 1)(2N_{ID}^{nSCID} + 1) + 2N_{ID}^{nSCID} + n_{SCID} + 2^k n_{sf}) \bmod 2^{31}$$

In another example, it is also possible to construct different value ranges for one or more of the parameters used to represent $C_{init}$, and to establish corresponding relationships between the different parameter values and the modification information in the multiple access signature information, so as to realize modification of the DMRS sequence. FIG. 7 shows an example of modifying the PN sequence according to an embodiment of the present disclosure. As shown in FIG. 7, the parameter $N_{ID}^{nSCID}$ may have corresponding relationships with various values of the spreading sequence group index, the spreading factor, and the number of symbol branches respectively. For example, in FIG. 7, the spreading sequence group 1, the spreading factor 2, the number 2 of symbol branches (that is, one symbol is separated into symbols of 2 branches) may correspond to the value 1 of $N_{ID}^{nSCID}$. In practical application scenarios, the corresponding value of $N_{ID}^{nSCID}$ may be substituted into any of the aforementioned expressions of $C_{init}$ to modify the DMRS sequence.

In another example, the value range of the scrambling identifier $n_{SCID}$ may also be changed, for example, may be changed from $\{0, 1\}$ to $\{0, 1, 2, 3\}$, and accordingly, the value range of $N_{ID}^{nSCID}$ may be changed correspondingly. For example, when $n_{SCID}$ is 2, the value range of $N_{ID}^{nSCID}$ may be $\{0, 1, \ldots, 7\}$; and when $n_{SCID}$ is 3, the value range of $N_{ID}^{nSCID}$ may be $\{0, 1, 2, 3\}$. In practical application scenarios, corresponding values of the scrambling identifier $n_{SCID}$ and $N_{ID}^{nSCID}$ whose value ranges have been changed may be substituted into any of the aforementioned expressions of $C_{init}$ to modify the DMRS sequence.

The specific examples of the implementation of the reference signal sequence being a PN sequence have been described above. In another implementation, the reference signal sequence may be a ZC (Zadoff-Chu) sequence. For example, a low peak-to-average power ratio (low-PAPR) sequence $r_{u,v}^{(\alpha, \delta)}(n)$ used to obtain the ZC sequence may be expressed as:

$$r_{u,v}^{(\alpha,\delta)}(n) = e^{j\alpha n}\bar{r}_{u,v}(n), \quad 0 \leq n \leq M_{ZC}$$

where $\alpha$ is a cyclic shift; $\delta$, $u$, and $v$ are generation parameters of the sequence; $\bar{r}_{u,v}(n)$ is a base sequence; and $M_{ZC}$ is a length of the ZC sequence. For example, the aforementioned low peak-to-average power ratio sequence may be obtained according to the 3GPP standard TS38.211.

Then, the ZC sequence may be generated based on the low peak-to-average power ratio sequence $r_{u,v}^{(\alpha, \delta)}(n)$.

However, in this embodiment, considering the above-mentioned situation, modification information is introduced to modify the low peak-to-average power ratio sequence $r_{u,v}^{(\alpha, \delta)}(n)$ generated in the above manner, and then modify the ZC sequence.

Specifically, in the above example where the reference signal sequence is a ZC sequence, the low peak-to-average power ratio sequence $r_{u,v}^{(\alpha, \delta)}(n)$ in the ZC sequence may be determined according to the received information for indicating at least one of the multiple access mode, the spreading factor, the spreading sequence groups, the number of symbol branches, the index of symbol branches, and the power allocation factor, and the ZC sequence may be generated based on the low peak-to-average power ratio sequence $r_{u,v}^{(\alpha, \delta)}(n)$. More specifically, a corresponding relationship between the information for indicating at least one of the multiple access mode, the spreading factor, the spreading sequence groups, the number of symbol branches, the index of symbol branches and the power allocation factor, and at least one of the base sequence $\bar{r}_{u,v}(n)$ and the cyclic shift $\alpha$ may also be established based on the above formula, to modify and determine the ZC sequence.

In an example, the information indicating the spreading factor may be used to modify the cyclic shift $\alpha$, to determine the low peak-to-average power ratio sequence $r_{u,v}^{(\alpha, \delta)}(n)$. FIG. 8 shows an example of modifying the ZC sequence according to an embodiment of the present disclosure. As shown in FIG. 8, the cyclic shift $\alpha$ may have a corresponding relationship with the spreading factor. For example, when the spreading factor is 1, $\alpha$ may take the value $a_i$; and when the spreading factor is 2, $\alpha$ may take the value $a_z$. FIG. 8 herein is only an example, and the corresponding relationship may also be other relationships. In this example, the spreading factor may be indicated to the UE by the base station through signaling transmission modes such as MAC CEs, RRC, DCI and the like, so that the UE may learn a corresponding value of the cyclic shift $\alpha$ according to a value of the spreading factor, and substitute it into the above formula to determine the low peak-to-average power ratio sequence $r_{u,v}^{(\alpha, \delta)}(n)$.

In another example, the information indicating the spreading sequence groups may be used to modify the cyclic shift $\alpha$, to determine the low peak-to-average power ratio sequence $r_{u,v}^{(\alpha, \delta)}(n)$. FIG. 9 shows an example of modifying the ZC sequence according to an embodiment of the present disclosure. As shown in FIG. 9, the cyclic shift $\alpha$ may have a corresponding relationship with the spreading sequence group index. For example, in FIG. 9, the spreading sequence group 1 may correspond to the value $\alpha_1$ of $\alpha$, and the spreading sequence group 2 may correspond to the value $\alpha_2$ of $\alpha$. FIG. 9 herein is only an example, and the corresponding relationship may also be other relationships. In practical application scenarios, the value of the cyclic shift α may be substituted into the above formula to determine the low peak-to-average power ratio sequence $r_{u,v}^{(\alpha,\delta)}(n)$.

Certainly, the above method of modifying $r_{u,v}^{(\alpha,\delta)}(n)$ by using the value of the cyclic shift α is only an example. In practical applications, one or more of other modification information of the multiple access signature information may also be used to modify the above formula to realize modification of the DMRS sequence.

With the above user equipment of the present disclosure, a relationship may be established between the multiple access signature information and the reference signal sequence of the user equipment to modify the reference signal sequence, thereby reducing interference between different user equipment in the wireless communication system, reducing overhead and improving performance of the wireless communication system.

A base station according to an embodiment of the present application will be described below with reference to FIG. 12. The base station may perform the method performed by a base station as described above. Since operations of the base station are substantially the same as the steps of the method described above, only a brief description is provided herein, while repeated descriptions of the same content are omitted.

Figure 12:
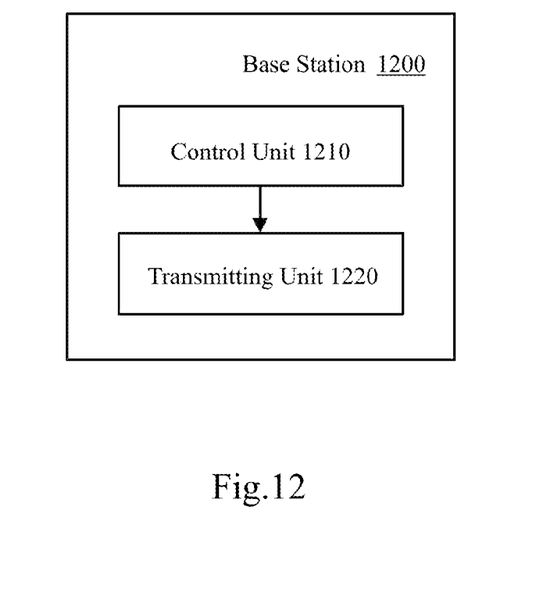
FIG. 12 shows a structural block diagram of a base station according to an embodiment of the present disclosure.

As shown in FIG. 12, the base station 1200 includes a control unit 1210 and a transmitting unit 1220. It should be appreciated that only components related to the embodiments of the present application are shown in FIG. 12 while other components are omitted, but this is only illustrative, and the base station 1200 may include other components as required.

The control unit 1210 determines multiple access signature information for a user equipment, where the multiple access signature information includes modification information indicating a reference signal sequence transmitted by the user equipment.

According to an embodiment of the present disclosure, the modification information included in the multiple access signature information indicating the reference signal sequence transmitted by the user equipment may include information for indicating at least one of a multiple access mode, a spreading factor, spreading sequence groups, a number of symbol branches, index of symbol branches and a power allocation factor.

In an example, the modification information included in the multiple access signature information may include information for indicating a multiple access mode. For example, the multiple access mode may include at least one of Orthogonal Multiple Access (OMA), Bit-level Non-Orthogonal Multiple Access (Bit-level NOMA) and Symbol-level Non-Orthogonal Multiple Access (Symbol-level NOMA).

In another example, the modification information included in the multiple access signature information may include information for indicating a spreading factor. For example, the spreading factor may be one or more of 1, 2, 4 . . . .

In another example, the modification information included in the multiple access signature information may include information for indicating spreading sequence groups. The spreading sequence groups may be determined according to groups of user equipment. For example, when performing spreading sequence grouping, the spreading sequence groups used for user groups may be determined in a set of spreading sequences by different received powers. That is, received powers are the same or similar within a same spreading sequence group; and received powers are different between different spreading sequence groups. In addition, value ranges of spreading sequences may also be different.

In another example, the modification information included in the multiple access signature information may include information for indicating at least one of the number of symbol branches and index of symbol branches. The number of symbol branches herein may be used to indicate the number of branches when symbols of multiple branches are combined into one symbol, or symbols of multiple branches are separated from one symbol during the generation of the OFDM symbols as shown in FIG. 2. The index of symbol branches may be used to indicate a serial number of each symbol in symbols of multiple branches when the OFDM symbols are generated, for example, the third symbol of the symbols of four branches.

In another example, the modification information included in the multiple access signature information may include information for indicating a power allocation factor. For example, the power allocation factor may indicate power allocation of the multiple access signature information in FIG. 2 for determining a transmission power allocated to the user equipment.

The above-described content indicated by the modification information of the multiple access signature information are merely examples, and in practical application processes, the modification information may indicate any other content, which is not limited herein.

The transmitting unit 1220 transmits the determined multiple access signature information to the user equipment.

The transmitting unit 1220 transmits the determined multiple access signature information to the user equipment by using one of Radio Resource Control (RRC) signaling, Downlink Control Information (DCI), Media Access Control (MAC) control elements (CEs) and the like, so that the user equipment may modify the reference signal sequence of the user equipment according to the information for indicating at least one of the multiple access mode, the spreading factor, the spreading sequence groups, the number of symbol branches, the index of symbol branches and the power allocation factor, to determine the reference signal sequence of the user equipment, such as, a DMRS sequence.

With the above base station of the present disclosure, a relationship may be established between the multiple access signature information and the reference signal sequence of the user equipment to modify the reference signal sequence, thereby reducing interference between different user equipment in the wireless communication system, reducing overhead and improving performance of the wireless communication system.

<Hardware Structure>

Figure 13:
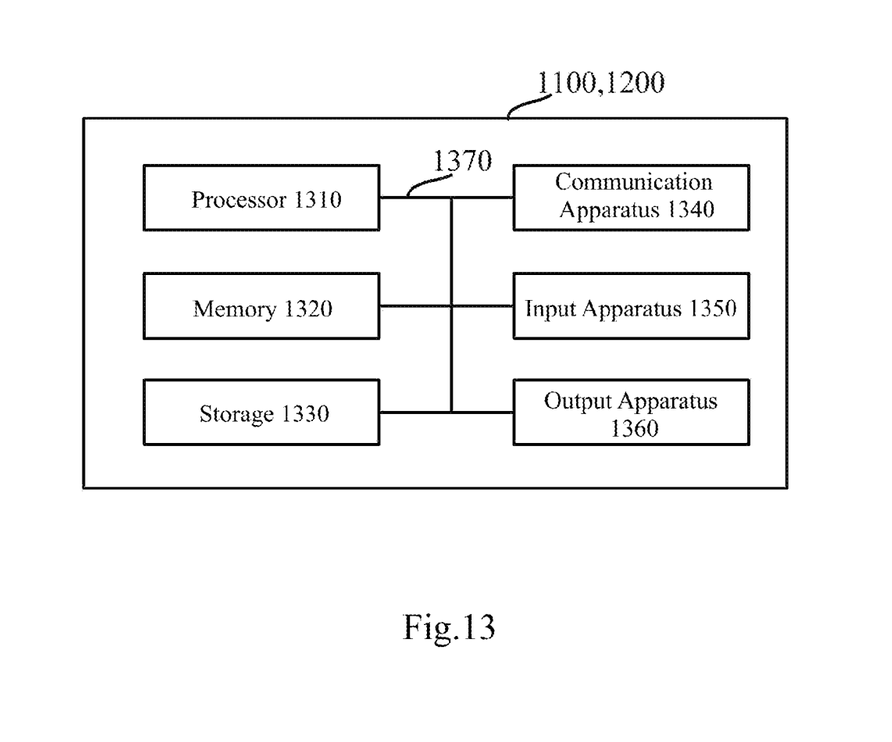
FIG. 13 shows a diagram of an example of a hardware structure of a user equipment and a base station involved in an embodiment of the present disclosure.

The transmitting device, the receiving device and the like in one embodiment of the present disclosure may function as a computer that executes the processes of the wireless communication method of the present disclosure. FIG. 13 shows a diagram of an example of a hardware structure of a user equipment and a base station involved in an embodiment of the present disclosure. The user equipment 1100 and the base station 1200 described above may be constituted as a computer apparatus that physically comprises a processor 1310, a memory 1320, a storage 1330, a communication apparatus 1340, an input apparatus 1350, an output apparatus 1360, a bus 1370 and the like In addition, in the following description, terms such as "apparatus" may be replaced with circuits, devices, units, and the like. The hardware structure of the user equipment 1100 and the base station 1200 may include one or more of the respective apparatuses shown in the figure, or may not include a part of the apparatuses.

For example, only one processor 1310 is illustrated, but there may be a plurality of processors. Furthermore, processes may be performed by one processor, or processes may be performed by more than one processor simultaneously, sequentially, or by other methods. In addition, the processor 1310 may be installed by more than one chip.

Respective functions of the user equipment 1100 and the base station 1200 may be implemented, for example, by reading specified software (program) onto hardware such as the processor 1310 and the memory 1320, so that the processor 1310 performs computations, controls communication performed by the communication apparatus 1340, and controls reading and/or writing of data in the memory 1320 and the storage 1330.

The processor 1310, for example, operates an operating system to control the entire computer. The processor 1310 may be constituted by a Central Processing Unit (CPU), which includes interfaces with peripheral apparatuses, a control apparatus, a computing apparatus, a register and the like.

In addition, the processor 1310 reads programs (program codes), software modules and data from the storage 1330 and/or the communication apparatus 1340 to the memory 1320, and execute various processes according to them. As for the program, a program causing computers to execute at least a part of the operations described in the above embodiments may be employed.

The memory 1320 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 1320 may also be referred to as a register, a cache, a main memory (a main storage apparatus) and the like. The memory 1320 may store executable programs (program codes), software modules and the like for implementing the wireless communication method involved in one embodiment of the present disclosure.

The storage 1330 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray disk, a removable disk, a hard driver, a smart card, a flash memory device (e.g., a card, a stick and a key driver), a magnetic stripe, a database, a server, and other appropriate storage media. The storage 1330 may also be referred to as an auxiliary storage apparatus.

The communication apparatus 1340 is a hardware (transceiver device) performing communication between computers via a wired and/or wireless network, and is also referred to as a network device, a network controller, a network card, a communication module and the like, for example. The communication apparatus 1340 may include a high-frequency switch, a duplexer, a filter, a frequency synthesizer and the like to implement, for example, Frequency Division Duplex (FDD) and/or Time Division Duplex (TDD).

The input apparatus 1350 is an input device (e.g., a keyboard, a mouse, a microphone, a switch, a button, a sensor and the like) that receives input from the outside. The output apparatus 1360 is an output device (e.g., a display, a speaker, a Light Emitting Diode (LED) light and the like) that performs outputting to the outside. In addition, the input apparatus 1350 and the output apparatus 1360 may also be an integrated structure (e.g., a touch screen).

Furthermore, the respective apparatuses such as the processor 1310 and the memory 1320 are connected by the bus 1370 that communicates information. The bus 1370 may be constituted by a single bus or by different buses between the apparatuses.

Furthermore, the user equipment 1100 and the base station 1200 may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 1310 may be installed by at least one of the hardware.

(Variations)

In addition, the terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

In addition, a radio frame may be composed of one or more periods (frames) in the time domain. Each of the one or more periods (frames) constituting the radio frame may also be referred to as a subframe. Further, a subframe may be composed of one or more slots in the time domain. The subframe may be a fixed length of time duration (e.g., 1 ms) that is independent of the numerology.

Furthermore, a slot may be composed of one or more symbols (OFDM (Orthogonal Frequency Division Multiplexing) symbols, SC-FDMA (Single Carrier Frequency Division Multiple Access) symbols, etc.) in the time domain. Furthermore, the slot may also be a time unit based on the numerology. Furthermore, the slot may also include a plurality of microslots. Each microslot may be composed of one or more symbols in the time domain. Furthermore, a microslot may also be referred to as a "subframe".

A radio frame, a subframe, a slot, a microslot and a symbol all represent a time unit during signal transmission. A radio frame, a subframe, a slot, a microslot and a symbol may also use other names that correspond to them, respectively. For example, one subframe may be referred to as a "transmission time interval (TTI)", a plurality of consecutive subframes may also be referred to as a "TTI", and one slot or one microslot may also be referred to as a "TTI." That is, a subframe and/or a TTI may be a subframe (1 ms) in the existing LTE, may be a period of time shorter than 1 ms (e.g., 1 to 13 symbols), or may be a period of time longer than 1 ms. In addition, a unit indicating a TTI may also be referred to as a slot, a microslot and the like instead of a subframe.

Herein, a TTI refers to the minimum time unit of scheduling in wireless communication, for example. For example, in LTE systems, a wireless base station performs scheduling for respective user terminals that allocates radio resources (such as frequency bandwidths and transmission power that can be used in respective user terminals) in units of TTI. In addition, the definition of the TTI is not limited thereto.

The TTI may be a transmission time unit of channel-coded data packets (transport blocks), code blocks, and/or codewords, or may be a processing unit of scheduling, link adaptation and so on. In addition, when the TTI is given, a time interval (e.g., the number of symbols) mapped to transport blocks, code blocks, and/or codewords actually may also be shorter than the TTI.

In addition, when one slot or one microslot is called a TTI, more than one TTI (i.e., more than one slot or more than one microslot) may also become the minimum time unit of scheduling. Furthermore, the number of slots (the number of microslots) constituting the minimum time unit of the scheduling may be controlled.

A TTI having a time duration of 1 ms may also be referred to as a normal TTI (TTI in LTE Rel. 8-12), a standard TTI, a long TTI, a normal subframe, a standard subframe, or a long subframe, and so on. A TTI that is shorter than a normal TTI may also be referred to as a compressed TTI, a short TTI, a partial (or fractional) TTI, a compressed subframe, a short subframe, a microslot, a subslot, and so on.

In addition, a long TTI (e.g., a normal TTI, a subframe, etc.) may also be replaced with a TTI having a time duration exceeding 1 ms, and a short TTI (e.g., a compressed TTI, etc.) may also be replaced with a TTI having a TTI duration shorter than the long TTI and longer than 1 ms.

A resource block (RB) is a resource allocation unit in the time domain and the frequency domain, and may include one or more consecutive subcarriers in the frequency domain. Also, an RB may include one or more symbols in the time domain, and may be one slot, one microslot, one subframe or one TTI duration. One TTI and one subframe may be composed of one or more resource blocks, respectively. In addition, one or more RBs may also be referred to as "physical resource blocks (PRBs (Physical RBs))", "Sub-Carrier Groups (SCGs)", "Resource Element Groups (REGs)", "PRG pairs", "RB pairs" and so on.

Furthermore, a resource block may also be composed of one or more resource elements (REs). For example, one RE may be a radio resource area of one subcarrier and one symbol.

In addition, structures of the radio frames, subframes, slots, microslots and symbols, etc. described above are simply examples. For example, configurations such as the number of subframes included in a radio frame, the number of slots of each subframe or radio frame, the number or microslots included in a slot, the number of symbols and RBs included in a slot or microslot, the number of subcarriers included in an RB, the number of symbols in a TTI, the symbol duration and the cyclic prefix (CP) duration may be variously altered.

Furthermore, the information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

The names used for the parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

The information, signals and the like that are input or output may be stored in a specific location (for example, in a memory), or may be managed in a control table. The information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The wireless base station is sometimes referred to as terms such as a fixed station, a NodeB, an eNodeB (eNB), an access point, a transmitting point, a receiving point, a femto cell, a small cell and the like.

A wireless base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a wireless base station sub-system (for example, a small base station for indoor use (a Remote Radio Head (RRH)). Terms like "cell" and "sector" refer to a part of or an entirety of the coverage area of a wireless base station and/or a sub-system of the wireless base station that provides communication services in this coverage.

In this specification, terms such as "Mobile Station (MS)", "user terminal", "User Equipment (UE)", and "terminal" may be used interchangeably. The wireless base station is sometimes referred to as terms such as a fixed station, a NodeB, an eNodeB (eNB), an access point, a transmitting point, a receiving point, a femto cell, a small cell and the like.

The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, both the user equipment 1100 and the base station 1200 in this specification may be replaced with a wireless base station or a user terminal.

In this specification, specific actions configured to be performed by the base station sometimes may be performed by its upper nodes in certain cases. Obviously, in a network composed of one or more network nodes having wireless base stations, various actions performed for communication with terminals may be performed by the wireless base stations, one or more network nodes other than the wireless base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (New Radio Access Technology), NR (New Radio), NX (New radio access), FX (Future generation radio access), GSM (Global System for Mobile communications), CDMA 2000, UMB (Ultra Mobile Broadband), IEEE 802.11 (Wi-Fi®), IEEE 802.16 (WiMAX®), IEEE 802.20, UWB (Ultra-Wide Band), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A user equipment, comprising:
 a receiving unit configured to receive multiple access signature information for the user equipment from a base station, wherein the multiple access signature information includes modification information indicating a reference signal sequence transmitted by the user equipment; and a control unit configured to determine the reference signal sequence of the user equipment according to the received modification information, wherein in the case the reference signal sequence is a PN sequence, the control unit determines a pseudo-random initial sequence in the PN sequence according to the received modification information, and generates the PN sequence based on the pseudo-random initial sequence, and wherein in the case the reference signal sequence is a ZC sequence, the control unit determines a low peak-to-average power ratio sequence in the ZC sequence according to the received modification information, and generates the ZC sequence based on the low peak-to-average power ratio sequence.

2. The user equipment of claim 1, wherein:

the modification information includes information for indicating at least one of a multiple access mode, a spreading factor, spreading sequence groups, a number of symbol branches, index of symbol branches, and a power allocation factor;

the control unit determines the reference signal sequence of the user equipment according to the received information for indicating at least one of the multiple access mode, the spreading factor, the spreading sequence groups, the number of symbol branches, the index of symbol branches, and the power allocation factor.

3. The user equipment of claim 1, wherein:

in the case the reference signal sequence is a PN sequence, the control unit determines at least one of a number of symbols in each slot, a density of physical layer cells, and a scrambling identifier according to the received modification information, and generates the pseudo-random initial sequence based on the at least one of the number of symbols in each slot, the density of physical layer cells, and the scrambling identifier.

4. The user equipment of claim 1, wherein:

in the case the reference signal sequence is a ZC sequence, the control unit determines at least one of a base sequence and a cyclic shift according to the received modification information, and generates the low peak-to-average power ratio sequence based on the at least one of the base sequence and the cyclic shift.

5. A base station, comprising:

a control unit configured to determine multiple access signature information for a user equipment, wherein the multiple access signature information includes modification information indicating a reference signal sequence transmitted by the user equipment; and a transmitting unit configured to transmit the determined multiple access signature information to the user equipment, wherein in the case the reference signal sequence is a PN sequence, the PN sequence is obtained by the user equipment through determining a pseudo-random initial sequence in the PN sequence according to the received modification information, and generating the PN sequence based on the pseudo-random initial sequence, and wherein in the case the reference signal sequence is a ZC sequence, the ZC sequence is obtained by the user equipment through determining a low peak-to-average power ratio sequence in the ZC sequence according to the received modification information, and generating the ZC sequence based on the low peak-to-average power ratio sequence.

6. The base station of claim 5, wherein:

the modification information includes information for indicating at least one of a multiple access mode, a spreading factor, spreading sequence groups, a number of symbol branches, index of symbol branches, and a power allocation factor.

7. A method performed by a user equipment, the method comprising:

receiving multiple access signature information for the user equipment from a base station, wherein the multiple access signature information includes modification information indicating a reference signal sequence transmitted by the user equipment; and determining the reference signal sequence of the user equipment according to the received modification information, wherein in the case the reference signal sequence is a PN sequence, the determining the reference signal sequence of the user equipment according to the received modification information comprises determining a pseudo-random initial sequence in the PN sequence according to the received modification information, and generating the PN sequence based on the pseudo-random initial sequence, and wherein in the case the reference signal sequence is a ZC sequence, the determining the reference signal sequence of the user equipment according to the received modification information comprises determining a low peak-to-average power ratio sequence in the ZC sequence according to the received modification information, and generating the ZC sequence based on the low peak-to-average power ratio sequence.

* * * * *